Figure 5:
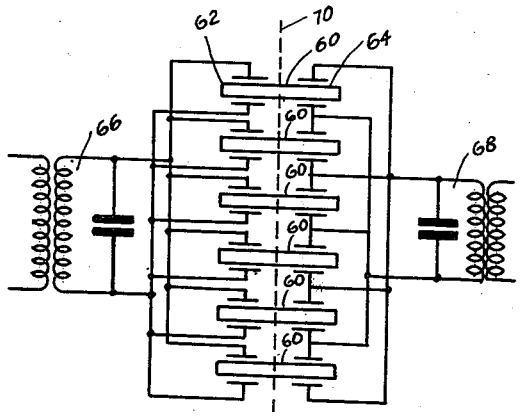

May 14, 1935.  C. W. HANSELL  2,001,387
FILTER
Filed Sept. 24, 1931  3 Sheets-Sheet 1
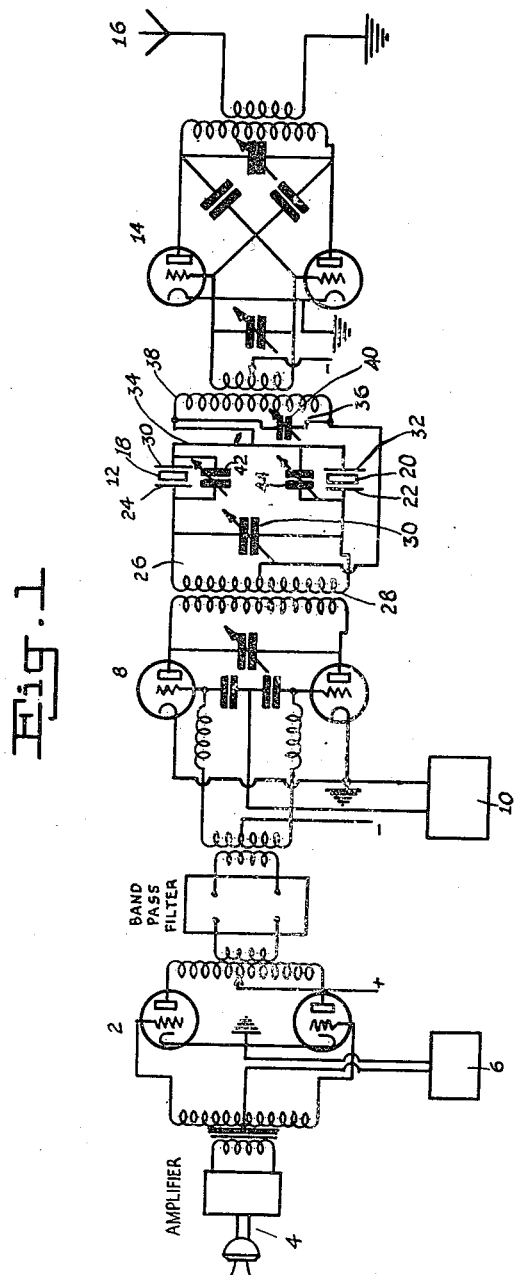
INVENTOR
CLARENCE W. HANSELL
BY
ATTORNEY May 14, 1935.  C. W. HANSELL  2,001,387
FILTER
Filed Sept. 24, 1931  3 Sheets-Sheet 2
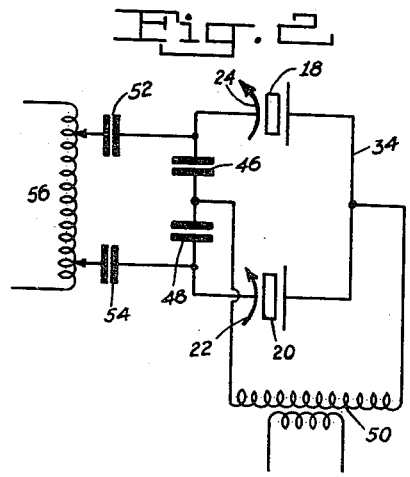
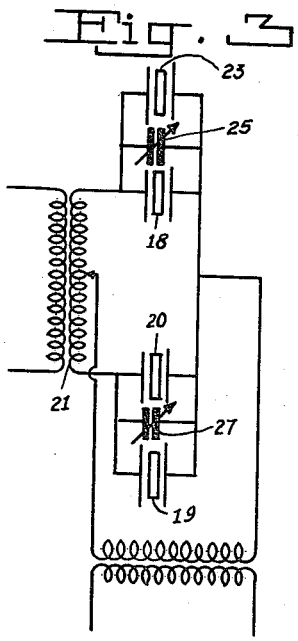
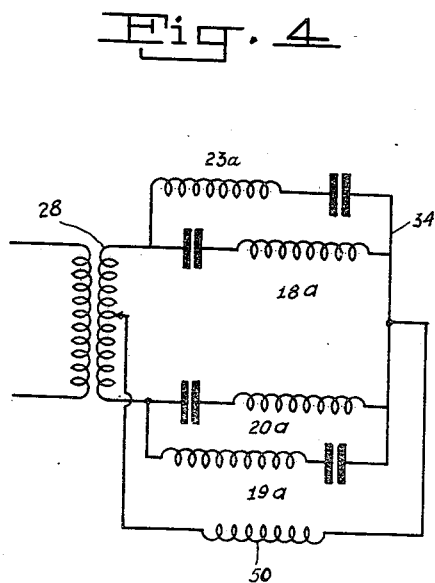
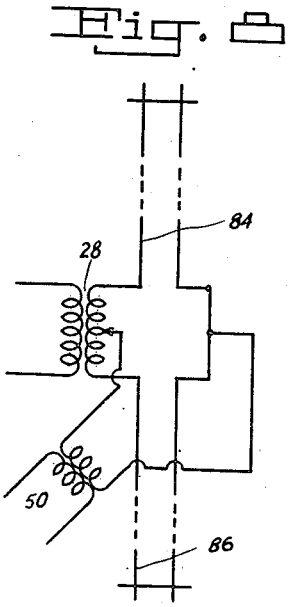
INVENTOR
CLARENCE W. HANSELL
BY
ATTORNEY May 14, 1935.  C. W. HANSELL  2,001,387
FILTER
Filed Sept. 24, 1931   3 Sheets-Sheet 3

INVENTOR
CLARENCE W. HANSELL
BY
ATTORNEY

Patented May 14, 1935

2,001,387

UNITED STATES PATENT OFFICE 2,001,387

FILTER

Clarence W. Hansell, Port Jefferson, N. Y., assignor to Radio Corporation of America, a corporation of Delaware Application September 24, 1931, Serial No. 564,770

6 Claims. (Cl. 178—44)

This invention relates to a filtering system and especially to filters utilizing resonant means or elements such as piezo-electric crystals, magnetostriction oscillators or tunable circuits in general which are claimed in my copending divisional applications Serial No. 638,475, filed October 19, 1932, Serial No. 638,476, filed October 19, 1932, and Serial No. 14,559, filed April 4, 1935.

It has been proposed to use a piezo-electric crystal as a filter, but, it has been found under certain circumstances that such a filter, especially when neutralized in accordance with my invention described in my copending application Serial Number 203,901, filed July 7, 1927, does not pass a sufficiently wide band of frequencies. I found that the simple paralleling of crystals having overlapping resonance curves, for obtaining a band pass filter, does not present all that is to be desired for, at frequencies mid-way between the resonance points of the two crystals it will be found that one crystal acts as an effective inductance and the other an effective capacity. Consequently, the pair of crystals act as an anti-resonant circuit preventing a transfer of energy at a desired energy passing frequency.

To overcome these defects is the principal object of my present invention and to do so I reverse the polarity of voltages applied to, in general, resonant elements or systems, such as crystals, with overlapping resonance curves, so that the currents through the elements or crystals will no longer oppose but will add for all frequencies between their resonance frequencies. At the same time, for frequencies lying on the same side of their resonance curves but well up on the resonance curve of one element or crystal, there is little cancellation of the passed currents for the reason that the current through one of the crystals or elements is much larger than the others. Beyond the desired pass band the crystal currents, of course, cancel more completely and the suppression of undesired frequencies is accomplished.

A further object of my present invention is to provide in combination with a side band telephony system, an improved crystal or other resonant element filter as just briefly described. In this manner, for single side band telephony, a lesser number of modulation stages are needed for the reason that the filter will operate satisfactorily with much smaller percentage differences in the frequency of the side bands than heretofore found possible.

Another object of my present invention is to provide in combination with a radio receiver an improved crystal filter which will permit improved frequency selectivity and more efficient reception than heretofore possible.

Still another object of my present invention is to provide for the neutralization of the interelectrode capacities of the crystals used in my improved band pass filter. In this manner, a much sharper band pass and more complete suppression of undesired frequencies is obtained for the filtering system. Briefly, in order to accomplish this I use the interelectrode capacity of one crystal, or that interelectrode capacity supplemented by an additional capacity, to neutralize the interelectrode capacity of the other crystal and vice versa.

Still a further object of my present invention is to provide improved filtering circuits comprising resonant elements or systems other than piezo-electric crystals; for example, magnetostriction oscillators, resonant sections of transmission lines and series tuned circuits having overlapping resonance curves being so connected whereby the connected combinations act as improved filters.

In order to sharpen the characteristic of ordinary filters, it is a further object of my present invention to provide means, preferably a filter circuit according to my present invention, in parallel with the ordinary filter circuit whereby its characteristic may be improved.

Figure 6:
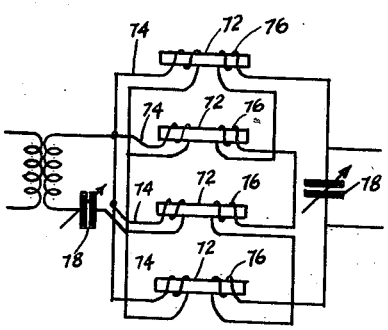
Figure 7:
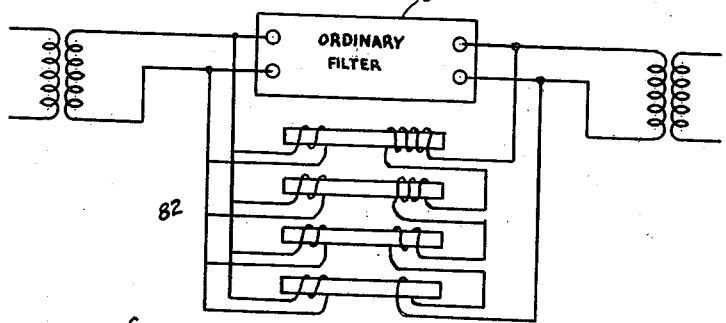
Figure 7:
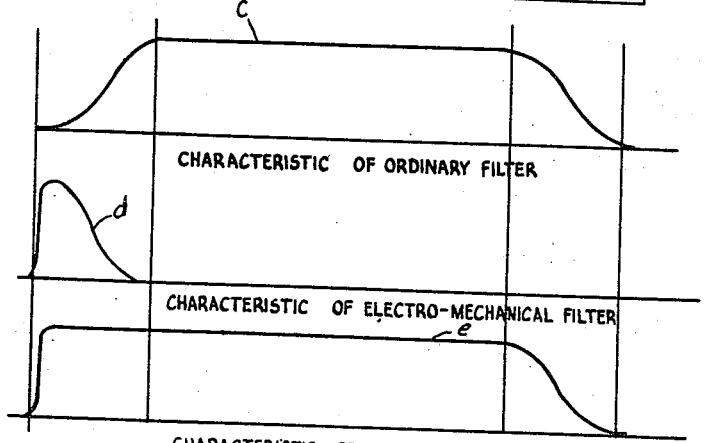

Although I have defined my invention as required by law with particularity in the appended claims, it may best be understood both as to its structural organization and mode of operation by referring to the accompanying drawings, wherein, Figure 1 is a schematic wiring diagram of a single side band transmitter incorporating therein my improved band pass crystal filter, Figures 2 to 4 inclusive illustrate some of the possible modifications of my improved filtering system, Figures 5 and 6 show two of many possible applications of my improved band pass filter to receiving circuits, Figure 7a illustrates an arrangement for improving the band pass characteristic of an ordinary filter, Figure 7b illustrates curves given to explain the system shown in Figure 7a, and, Figure 8 illustrates the application of resonant sections of transmission lines for filtering purposes.

Turning to Figure 1, a relatively low frequency carrier suppression modulator 2 is supplied with modulating potentials from a suitable source 4 and with carrier energy from a carrier source 6. Single side band energy from the carrier suppression modulator 2 is passed by a band pass filter and undesired frequencies are rejected. The operation is well known in the art and need not be repeated here. The single side band output of this modulator is fed to a second carrier suppression modulator 8 supplied with high frequency carrier energy from a source 10.

By the use of my improved band pass filter 12, whose structure and operation will be described more fully hereinafter, a single side band is separated from the side bands appearing in the output circuit of modulator 8 and this side band energy is further amplified by a power amplifier 14 of which only one stage of the several cascaded stages, which may be used, is shown, and thence transmitted over a suitable radiating antenna 16.

As far as I am aware, without my improved filter 12, a single side band transmitter with an output frequency higher than about 3,000 kilocycles requires at least three stages of carrier suppression modulation in order that the percentage difference between the desired side band and the suppressed carrier and other side band energies might be sufficient for obtainable filters to discriminate between them. Since my new filter circuit is much more selective than previously known band pass filters it permits one stage of modulation to take the place of two or more of the stages previously required.

My improved band pass filter comprises a plurality of resonant or oscillating elements, here in the form of piezo-electric crystals 18, 20, like electrodes 22, 24 of which are connected serially, in phase opposition or in reversed polarity by means of an impedance 26 here in the form of a broadly tuned circuit comprising reactor or inductor 28 and variable reactor or capacitor 30. The other electrodes 30, 32 of the band pass filter are conductively connected by connection 34. Between connection 34 and a point of substantially zero alternating potential, or a point substantially at the mid-point of alternating current circuit 26, there is connected an alternating current output circuit 36 comprising inductance 38 and variable capacity 40.

By virtue of the connections just described, input energy is applied to the crystals in reversed phase as a result of which, for the mean frequency to be passed by crystals 18, 20, ground to have overlapping resonance curves, their outputs add; whereas it is to be noted, if they were simply connected in parallel, the mean frequency desired to be passed would not be passed. For some frequencies within the desired pass band which lie on the same side of the resonance curves of both crystals, there is some cancellation, but this is not serious for the reason that by virtue of the resonance characteristics of the crystals in this region, one crystal will be passing a large amount of current whereas the other will be passing a relatively small amount of current. Hence, the pass band is almost as wide as the sum of the pass bands of the two individual crystals.

By virtue of the connection of the output circuit, it should be clear that by suitable spacing of the electrodes of the crystals 18, 20, the transfer of energy outside the resonance bands of the crystals themselves may be prevented by making the interelectrode capacity of one crystal neutralize the interelectrode capacity of the other crystal. To facilitate this action supplementary or trimming condensers 42, 44 may be used if found desirable. These condensers, of course, supplement or add to the interelectrode capacities of the electrodes 24, 30 and 22, 32. An alternative method for obtaining an exact neutralizing adjustment is available by varying the position of the connection from one end of the output circuit to the point near the center of coil 28.

Of course, as already indicated, adjustment of the crystal electrodes alone may be sufficient to establish complete neutralization, and, as means for varying the spacing and area of crystal electrodes are well known in the art, they need not be described in detail here.

The filtering circuit shown, as will occur readily to one skilled in the art, may be varied in many ways without departing from the spirit of the present invention. Thus, for example, as shown in Figure 2, the alternating current circuit 26 may be replaced by a pair of series connected condensers 46, 48 preferably of about the same size and between which and the conductive connection 34 there is connected an alternating circuit 50 in the form of a single inductance coil. The impedance formed by condensers 46, 48 may also be connected through blocking condensers 52, 54, to some other alternating current circuit 56, and, neutralization may be accomplished by varying the spacing of electrodes 24, 22 of crystals 18, 20 or by varying the relative capacities of condensers 46 and 48.

Although, in Figure 1, I have shown only two crystals by way of illustration it should be noted that my invention includes the use of any number of crystals, having successively overlapping resonance curves, in my filter circuit. If more than two crystals are used, then those with successively overlapping resonance curves are connected with reversed polarity in the manner shown for the two crystals.

In designing the filter I may obtain a very narrow pass band and large ratio between the energies passed for desired and undesired frequencies by using low impedance input and output circuits for the filter. In other cases where a broader pass band for each crystal is desired so that a large band of frequencies may be passed with a minimum number of crystals I may use high impedance input and output circuits, though in this case the ratio of energies passed at desired and undesired frequencies is decreased.

It should be understood that the input and output ends of the filter may be reversed without changing its characteristics. In other words, it is a band pass filter for energy passing through it in either direction.

As previously stated, if a wider pass band is desired, any number of crystals with successively overlapping resonance curves may be used, provided crystals ground for adjacent frequencies are connected to opposite sides of the filter input circuit. Thus, as shown in Figure 3, if it is desired to increase the frequency band width on the side of the mean frequency passed and on the side of the mean frequency towards which the resonance curve of crystal 18 lies for the greater part, then an additional crystal 19 may be added, connected as shown to the opposite side of the input circuit 21, opposite in the sense that it is opposite the side of the inductance coil 21 to which crystal 18 is connected.

Similarly, if it is desired to increase the frequency band width in the direction of the frequencies passed by crystal 20, an additional crystal 23 having a characteristic overlapping that of crystal 20 may be added connected to the side opposite of input circuit 21 to that to which crystal 20 is connected. Neutralization may be added if found desirable by adjustment of the various crystal electrodes, by the addition of supplementary trimming condensers 25, 27 or by varying the relative voltages applied to the two branches of the filter.

If desired my invention may be carried out with crystals having more than two electrodes. Figure 5 shows one way of using crystals with four electrodes. In this case no neutralization is required, particularly if the circuits are shielded.

More particularly, in Figure 5 the crystals 60 having overlapping resonance curves in accordance with what has gone hereinbefore are each provided with pairs of electrodes 62, 64 between which the crystals constitute a resonant means of electrical coupling through the piezo-electric effect and the mechanical vibration of the crystals. Capacitive feed of energy between the two circuits 66, 68 coupled by the filter including crystal element 60 is prevented by the use of suitable electrostatic shielding indicated diagrammatically at 70. From what has been said hereinbefore the operation of the system shown in Figure 5 should be obvious and therefore requires no further discussion.

The present invention is not, of course, limited to the use of crystals; for, they may be replaced by other oscillator systems or resonant elements. Thus, for example, inasmuch as the crystals act in a fashion similar to series tuned circuits they may be replaced by series tuned circuits having similar overlapping resonance curves or in general, any form of oscillating system or element. Thus, in Figure 4, the series resonant circuits 18a, 20a have overlapping resonance curves similar to crystals 18, 20 of Figure 3. Similarly, series tuned circuit 23a has a resonance curve overlapping series tuned circuit 20a and the curve of circuit 19a overlaps the curve of series tuned circuit 18a. In this modification, of course, no neutralization need be provided. The alternating output circuit 50 is connected between the conductive connection 34 connecting one terminal of the series tuned circuits together and a point intermediate the ends, preferably at a point of zero alternating potential of input coil 28. This coil, of course, connects the other ends of the tuned circuits 18a and 20a in phase opposition as well as connecting 23a, 20a and, 18a and 19a in phase opposition, which pairs of circuits have overlapping characteristic curves.

Similarly, my invention may also be carried out with other forms of resonant elements, systems or electromechanical oscillators. For instance magnetostriction oscillators with overlapping resonance curves may be used by connecting all input coils in parallel, with like polarity, and the output coils with alternatingly reversed polarity, or vice versa. The magnetostriction oscillators for a coupling between input and output circuits of the filter by means of the well known magnetostriction phenomena and the resonance characteristics of the rod which form the oscillator. The phase of energy fed through this coupling reverses as the frequency passes through resonance for the rod in the same manner as the coupling through piezo-electric crystals and this requires the alternatingly reversed polarity of the coils shown in Figure 6. In general filters with magnetostriction oscillators are suitable for operation at lower frequencies than are piezo-electric crystals.

Thus, as shown in Figure 6, for low frequencies, rather than use oscillatory systems or elements in the form of piezo-electric crystals or tunable circuits, I make use of electromechanical oscillators in the form of magnetostriction oscillators 72 known to the art. These magnetostriction oscillators are made of any magnetostrictive material, such as nickel, which possesses the property of converting electromagnetic energy into mechanical energy and vice versa. The input coils 74 are connected in parallel and with like polarity whereas the output coils 76 are alternatingly connected with reversed polarity. If desired, of course, the coils 76 may be considered the input side of the system and coils 74 the output side of the system, the direction in which energy is passed by the filter being immaterial. Variable condensers 78 are provided for tuning the inductance of the oscillators, and, as indicated any form of coupling to other circuits may be used such as direct, conductive connection or inductive coupling.

In Figures 1, 5 and 6, the tuning of the input and output circuits for the filters shown not only assist in obtaining the best impedances to use with the filter but it also suppresses undesired frequencies. The electromechanical oscillators, such as piezo-electric crystals and magnetostriction oscillators and also resonant transmission lines respond to a series of frequencies and exhibit resonance at frequencies approximately in harmonic relation. The tuned input and output circuits do not respond to harmonics of their fundamental frequencies and so suppress undesired frequencies which would otherwises pass through the filter. Thus I combine broadly tuned circuits having only one resonant frequency with circuits, or mechanically oscillating equivalents of circuits, which tune sharply for a series of frequencies, to obtain a filter with sharp frequency discrimination but only one pass band.

As indicated hereinbefore a still further use for my invention is to sharpen up the cut-off characteristics of the more common types of filters. This may be done by connecting one of my electromechanical filters in parallel with an ordinary filter. Then, if the pass band of the electromechanical filter lies in the imperfect cut-off region of the ordinary filter it will extend the pass band of the ordinary filter and the cut-off characteristics of the combination will be that of the electromechanical filter, which is very sharp, while the width of pass band will be substantially that of the ordinary filter.

Referring to Figure 7a wherein one such arrangement is shown, an ordinary filter 80 is paralleled with an improved filter 82 according to my present invention.

The characteristic curve of the ordinary filter is given by curve c of Figure 7b, and the characteristic curve of filter 82 is given by curve d of Figure 7b, and the improved characteristic of the combined filters is given by curve e of Figure 7b.

If it is desired to sharpen up both ends of curve c of the ordinary filter, it should be paralleled by another of my improved filters having a band pass characteristic corresponding in frequency to the other end of the frequency range of the ordinary filter whose curve is illustrated by curve c of Figure 7b.

It will be noted that I have shown a somewhat triangular shaped characteristic for the electromechanical filter to make it correct the ordinary filter more perfectly. I may obtain this triangular characteristic by varying the number of turns in the coils of the magnetostriction oscillators as shown or I may use various sizes of series impedances with any form of electromechanical vibrator.

In the crystal filter of Figure 5 I may obtain the desired results by varying the sizes of the crystal electrodes or by varying the couplings to either input or output electrodes or both. In fact any method for varying the effectiveness of the individual vibrators, including the application of damping, may be used whereby the combination of filters give the desired characteristic.

In Figure 8, I have shown the application of resonant sections of transmission lines for providing a filter-coupling between two circuits 28, 50, either one of which may be considered the input circuit and the other an output circuit. The lines 84, 86 are adjusted in length so as to be resonant on opposite sides of a mean frequency which it is desired to transmit between the two circuits 28, 50.

In my claims where I speak of connecting the filter circuit elements "cophasally" or "in phase opposition" it is to be understood that I refer to the phase conditions which would correspond to resonance of the elements. Since the elements will not be resonant for the same frequencies and their currents change phase as the frequency is changed it must be understood that I have used the expressions "cophasally" and "in phase opposition" for want of more expressive language.

Having thus described my invention, what I claim is:

1. A piezo-electric crystal filter comprising an input source of current supply having a plurality of different desired resonant frequencies, a pair of piezo-electric crystals, said crystals having symmetrically displaced overlapping resonant currents, of similar characteristics as said desired resonant frequencies, an inductance coil connected serially between a pair of electrodes of said crystals, a conductive connection connecting other electrodes of said crystals together conductively, an alternating current circuit coupled to said inductance coil, an alternating current circuit connected to the mid-point of said coil and to said conductive connection, means for varying the capacity between electrodes of one of said crystals, and, means for varying the capacity between electrodes of said other crystal.

2. A piezo-electric crystal filter comprising an input source of current supply having a plurality of different desired resonant frequencies, a pair of piezo-electric crystals having overlapping resonance curves, of similar characteristics as said desired resonant frequencies, an impedance connection connected between like electrodes of said crystals, a low impedance connection connecting the other electrodes of said crystals effectively directly together, and, an alternating current circuit connected between substantially the mid-point of said impedance connection, said mid-point connection effectively directly connecting together the electrodes of said crystals to an output inductance of said filter.

3. A band pass filter arrangement comprising a pair of systems each having the resonant characteristic of a tuned electrical circuit, the systems being so dimensioned that their resonant characteristics overlap, a connection having appreciable impedance connected between two ends of said systems, a low impedance connection connecting together the other two ends of said systems, and an alternating current circuit connected between an intermediate point on said connection having appreciable impedance and a point on said low impedance connection, said arrangement passing electrical currents of substantially equal intensity throughout the range of frequencies including and between the resonant frequencies of said systems.

4. A band pass filter arrangement comprising a pair of systems each having the resonant characteristic of a series tuned electrical circuit, the systems being so dimensioned that their resonant characteristics though displaced in the frequency spectrum overlap, a connection having appreciable impedance connected between two ends of said systems, means for subjecting said impedance connection to alternating potentials whereby the ends to which said appreciable impedance connection is connected fluctuate in potential in phase opposition, a low impedance connection connecting together the other two ends of said systems, and an alternating current circuit connected between an intermediate point on said connection having appreciable impedance and a point on said low impedance connection, said arrangement passing electrical currents with substantially equal intensity throughout a range of frequencies lying between and including resonant frequencies of said systems.

5. Apparatus as claimed in claim 3 in which each of said systems comprise a piezo-electric crystal, the crystals being ground so as to have displaced but overlapping resonant characteristics.

6. Apparatus as claimed in claim 3 in which each of said systems comprise a piezo-electric crystal, the crystals being so ground as to have displaced but overlapping resonant curves, and means for varying the capacity effectively in shunt with each crystal.

CLARENCE W. HANSELL.